US012657980B2

(12) United States Patent
Reynolds et al.

(10) Patent No.: US 12,657,980 B2
(45) Date of Patent: Jun. 16, 2026

(54) EDGE COMPUTING TO DETERMINE AUGMENTED REALITY CONTENT ASSOCIATED WITH A TRANSPORTATION INFRASTRUCTURE

(71) Applicant: International Business Machines Corporation, Armonk, NY (US)

(72) Inventors: Spencer Thomas Reynolds, Austin, TX (US); Raden Tonev, Austin, TX (US); Zachary A. Silverstein, Jacksonville, FL (US); Jeremy R. Fox, Georgetown, TX (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 16/987,849

(22) Filed: Aug. 7, 2020

(65) Prior Publication Data

US 2022/0044510 A1     Feb. 10, 2022

(51) Int. Cl.
*G07C 11/00*          (2006.01)
*G06Q 10/1093*     (2023.01)
(Continued)

(52) U.S. Cl.
CPC ......... *G07C 11/00* (2013.01); *G06Q 10/1093* (2013.01); *G06Q 50/40* (2024.01);
(Continued)

(58) Field of Classification Search
CPC .... G06T 11/00; G06Q 20/3224; G06Q 50/30; G06Q 10/1093; G06Q 20/308;
(Continued)

(56) References Cited

U.S. PATENT DOCUMENTS

| | | | |
|---|---|---|---|
| 4,398,257 A | 8/1983 | Paganini | |
| 5,502,806 A | 3/1996 | Mahoney | |
| | | (Continued) | |

FOREIGN PATENT DOCUMENTS

| | | | | |
|---|---|---|---|---|
| CN | 110447050 A | * | 11/2019 | ............. G06Q 30/08 |
| WO | 2010026521 A1 | | 3/2010 | |
| | | (Continued) | | |

OTHER PUBLICATIONS

"Airports in The US Purchase Queue Management Services", iHLS, 6 pps., downloaded from the Internet on Jul. 23, 2020, <https://goo.gl/pL7xyW>.

(Continued)

*Primary Examiner* — Igor N Borissov
(74) *Attorney, Agent, or Firm* — Harrity & Harrity, LLP

(57) ABSTRACT

A method for utilizing IoT information to generate queue related augmented reality (AR) information associated with a transportation system. In an embodiment, the method includes at least one computer processor identifying a plurality of users within a staging area of a transportation system. The method further includes determining groups of users from among the plurality of users, based on a transportation route respectively associated with transportation information corresponding to respective users. The method further includes identifying a first vehicle that a first user is scheduled to board, based on an indication of the first vehicle in the transportation information associated with the first user. The method further includes determining AR information related to queues associated with boarding the first vehicle and transportation information corresponding to groups of users within a proximity of the queues associated with boarding the first vehicle, and presenting to the first user, the AR information.

20 Claims, 4 Drawing Sheets

(51) Int. Cl.
| | |
|---|---|
| *G06Q 50/40* | (2024.01) |
| *G06T 11/00* | (2006.01) |
| *G06Q 20/04* | (2012.01) |
| *G06Q 50/26* | (2012.01) |
| *G16Y 10/40* | (2020.01) |
| *G16Y 20/10* | (2020.01) |
| *G16Y 40/20* | (2020.01) |

(52) U.S. Cl.
CPC .......... *G06T 11/00* (2013.01); *G06Q 20/0457* (2013.01); *G06Q 50/265* (2013.01); *G06Q 2240/00* (2013.01); *G07C 2011/04* (2013.01); *G16Y 10/40* (2020.01); *G16Y 20/10* (2020.01); *G16Y 40/20* (2020.01)

(58) Field of Classification Search
CPC .......... G06Q 2240/00; G06Q 20/0457; G06Q 50/265; G07C 11/00; G07C 2011/04; G16Y 10/40; G16Y 40/20; G16Y 20/10; G07B 15/02
USPC ........................................................ 705/13
See application file for complete search history.

(56) References Cited

U.S. PATENT DOCUMENTS

| | | | | |
|---|---|---|---|---|
| 6,529,786 | B1 | 3/2003 | Sim | |
| 9,372,086 | B2 | 6/2016 | Cardonha | |
| 10,242,457 | B1 * | 3/2019 | Sibley | H04N 9/3182 |
| 10,362,459 | B1 | 7/2019 | Jones | |
| 10,440,679 | B2 | 10/2019 | Arumugam | |
| 2004/0158482 | A1 | 8/2004 | Hale | |
| 2005/0065834 | A1 | 3/2005 | Hale | |
| 2011/0273312 | A1 | 11/2011 | Eggleton | |
| 2014/0192085 | A1 * | 7/2014 | Kim | G06V 20/20 |
| | | | | 345/633 |
| 2016/0012375 | A1 | 1/2016 | Hanson | |
| 2016/0255475 | A1 | 9/2016 | Maguire | |
| 2017/0341746 | A1 | 11/2017 | Erickson | |
| 2019/0325239 | A1 | 10/2019 | Meyer | |
| 2020/0086891 | A1 * | 3/2020 | Maeng | G06F 3/1423 |

FOREIGN PATENT DOCUMENTS

| | | | |
|---|---|---|---|
| WO | 2012170958 | A1 | 12/2012 |
| WO | 2015090328 | A1 | 6/2015 |

OTHER PUBLICATIONS

"Augmented Reality and Virtual Reality Market 2019 Global Trends, Size, Segments and Growth by Forecast to 2025", MarketWatch, 16 pps., Mar. 20, 2019, <https://www.marketwatch.com/press-release/augmented-reality-and-virtual-reality-market-2019-global-trends-size-segments-and-growth-by-forecast-to-2025-2019-03-20>.

"Your Self Flying Personal Photographer", 5 pps., V-COPTR, © 2019 Zero Zero Robotics, <https://gethover.com/hover-camera-passport?d=pc- same as-https://zerozerorobotics.com/hover-camera-passport?d=pc>.

Brandom, "The US Border Patrol is trying to build face-reading drones", The Verge, Apr. 26, 2017, 5 pps., <https://www.theverge.com/2017/4/6/15208820/customs-border-patrol-drone-facial-recognition-silicon-valley-dhs>.

"Automated passenger tracking using video analytics", Crowdvision, © Copyright Crowd Vision Limited 2020, 6 pps., <https://www.crowdvision.com/solutions-airports/>.

Denman, "Automatic surveillance in transportation hubs: No Longer just about catching the bad guy", Expert Systems with Applications, 42(24), pp. 9449-9467, Dec. 30, 2015.

Hsu et al., "Face Recognition on Drones: Issues and Limitations", 12 pps., Last Update Sep. 28, 2019, <https://www.iis.sinica.edu.tw/~swc/pub/face_recognition_on_drones.html>.

Matsukuma et al., "Using People Flow Technologies with Public Transport", 5 ppps., 2017, Hitachi Review, 66(2), 145.

Matyunina et al., "How to Create an Augmented Reality Experience for Your Business", codetiburon, Apr. 13, 2019, 13 pps., <https://codetiburon.com/create-augmented-reality-experience-for-business/>.

Mayhew, "Face-Six releases facial recognition software for drones", Dec. 12, 2017, Biometric Update.com, 9 pps., <https://goo.gl/kGwZ8w>.

Saeed et al., "Argus: Realistic Target Coverage by Drones," 2017 16th ACM/IEEE International Conference on Information Processing in Sensor Networks (IPSN), Pittsburgh, PA, 2017, pp. 155-166.

Young, "IoT-Connected Sensors Create a New Kind of Forecast: Human Weather", Aug. 23, 2017, 6 pps., <https://www.esri.com/about/newsroom/publications/wherenext/new-forecast-human-weather/>.

Zanatalis et al., "A Review of Machine Learning and IoT in Smart Transportation", 23 pps., Future Internet, 2019, 11(4), 94.

* cited by examiner

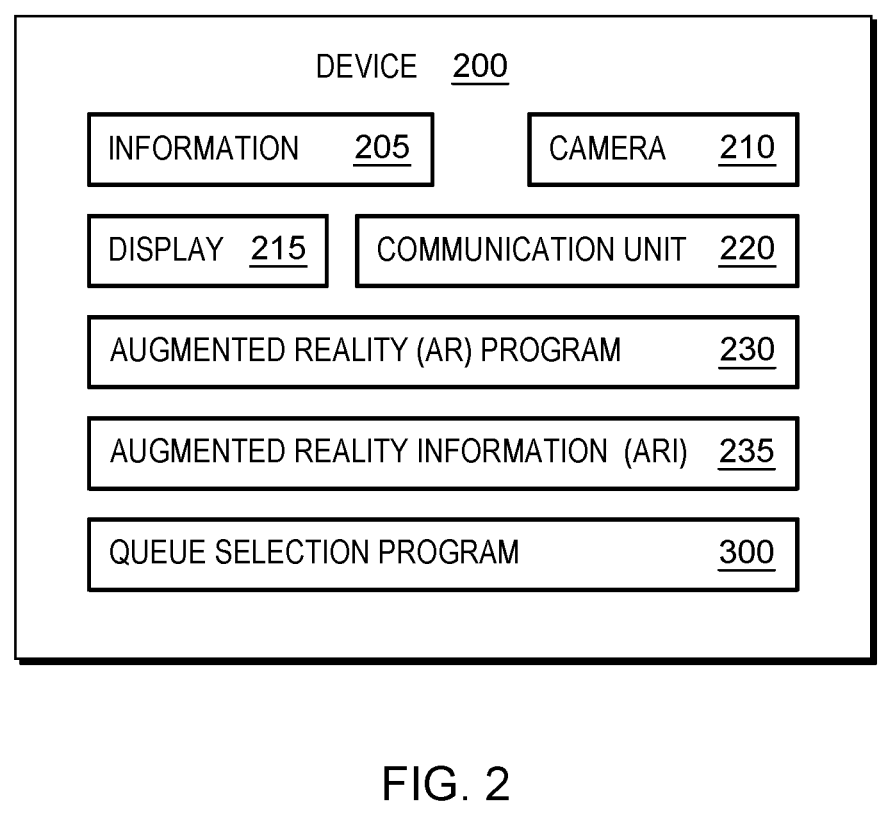

DEVICE    200

INFORMATION    205

CAMERA    210

DISPLAY    215

COMMUNICATION UNIT    220

AUGMENTED REALITY (AR) PROGRAM    230

AUGMENTED REALITY INFORMATION (ARI)    235

QUEUE SELECTION PROGRAM    300

FIG. 2

EDGE COMPUTING TO DETERMINE AUGMENTED REALITY CONTENT ASSOCIATED WITH A TRANSPORTATION INFRASTRUCTURE

BACKGROUND OF THE INVENTION

The present invention relates generally to the field of edge computing, and more particularly to utilizing Internet-of-Things devices and augmented reality (AR) within a trans-portation infrastructure.

Internet of Things (IoT) is defined as the ability of various physical devices and every-day objects to be connected to each other through the Internet. Embedded with electronics, Internet connectivity, and other forms of hardware (such as sensors), IoT devices can communicate and interact with others over the Internet, wireless network, and other inter-device communication methods such that the IoT devices can provide information and be remotely monitored/con-trolled. IoT devices can include human-to-device commu-nication. For example, a user utilizes an application on a mobile device to contact IoT devices to identify a service and/or navigate within a building or venue. In addition, some IoT devices (e.g., edge devices) in one area can perform edge computing analyses and only forward the relevant information to an applicable subset of users and/or IoT devices within another area.

Augmented reality (AR) is a view of a physical, real-world environment with elements augmented (overlaid) by computer-generated sensory input, such as graphical infor-mation. Generally, augmentation occurs in near real-time and in semantic context with various environmental ele-ments. AR overlays can integrate virtual information (e.g., shapes, colors, text, links to information, etc.) within and/or associated to the images or a video stream associated with features within the physical world. Various electronic (e.g., computing) devices can include AR capabilities and/or receive AR content information, such as smartphones, smart glasses, a heads-up display, a tablet computer, etc. For example, an edge computing device, such as an IoT device can generate content information that can be included within an AR overly displayed by another device.

SUMMARY

According to an aspect of the present invention, there is a method, computer program product, and/or system for utilizing IoT information to generate queue related aug-mented reality (AR) information associated with a mass-transit system. In an embodiment, the method includes at least one computer processor identifying a plurality of users within a staging area of a transportation system. The method includes at least one computer processor determining one or more groups of users from among the plurality of users, based on a transportation route respectively associated with transportation information corresponding to respective users of the plurality of users. The method includes at least one computer processor identifying a first vehicle at the staging area that a first user is scheduled to board, based on an indication of the first vehicle in the transportation informa-tion associated with the first user. The method includes at least one computer processor determining augmented reality (AR) information related to one or more queues associated with boarding the first vehicle and transportation informa-tion corresponding to one or more groups of users within a proximity of the one or more queues associated with boarding the first vehicle. The method includes at least one computer processor presenting to the first user, the AR information.

BRIEF DESCRIPTION OF THE DRAWINGS

FIG. 2 depicts an illustrative example of a configuration of a mobile device, in accordance with an embodiment of the present invention.

DETAILED DESCRIPTION

Figure 1:
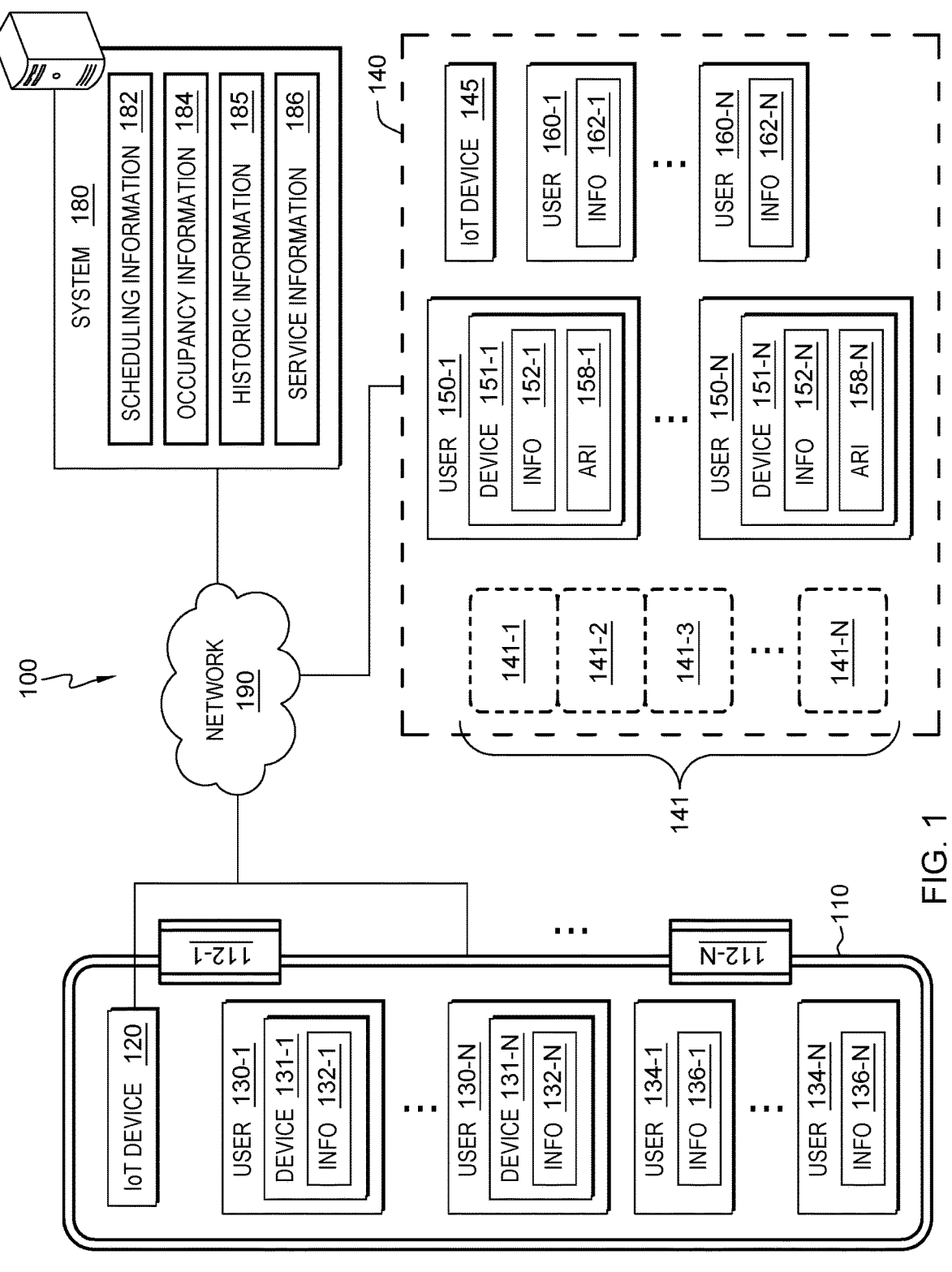
FIG. 1 illustrates a networked site environment, in accor-dance with an embodiment of the present invention.

Embodiments of the present invention recognize that as a user travels for work, pleasure, and/or personal business that the user will utilize various personal and public transporta-tion methods. Embodiments of the present invention recog-nize that various mass-transit modes, such as trains, buses, ferries, and airlines share physical infrastructures within a transportation hub or a station, such as staging areas or loading platforms. Embodiments of the present invention recognize that a mass-transit location can also include related services, such as security checkpoints, baggage checks, etc. Access to a mass-transit vehicle and/or service may require a user to navigate a queue of one type or another. Some queues are defined queues, such as a line for a customs inspection station or an X-ray luggage scanning unit. Other queues can be dynamic and/or crowd-initiated queues such as a line to access a baggage pickup, multiple lines forming along loading platform of a staging area to board a mode of transportation.

Embodiments of the present invention recognize that identifying and selecting a queue to join (e.g., utilize) in preparation to board a mode of transportation (e.g., one or more vehicles); or access a dictated service associated with a mode of transportation, can be problematic. Embodiments of the present invention recognize that some staging areas (e.g., waiting areas) can include multiple queues, and that the queues can dynamically change based on whether a staging area is utilized by a plurality of mass-transit vehicles that share some common pick-up/drop-off locations and operate on differing schedules/timetables, such as subway systems. For example, a shared mass-transit platform may be populated with a plurality of users awaiting trains running on differing schedules and heading along different routes.

Embodiments of the present invention further recognize that the number and positions of queues along the platform can be highly variable. For example, subway trains may include a differing number of cars and each car may have one or more doors. Riders seeking to board (e.g., embark) a subway train within some queues may be delayed boarding a car of the subway train because a group of riders within the car of the subway train seek to exit (e.g., disembark) through a given door of the car of the train. Other factors affecting queues can arise at a station that has a platform shorter than the arriving train, potentially creating a further bottleneck for some riders exiting certain subway cars; thereby, affect-ing some boarding queues.

Other embodiments of the present invention also recog-nize that access to a mode of transportation or another location may require a user to traverse a queue related to a dictated service before gaining access to an area associated with the mode of transportation or another location. In one example, a user is required to pass through a security, customs, and/or inspection area to access a mode of transportation. In another example, a user may need to pass through a dictated service to re-enter or exit other areas, such as a screening checkpoint.

Embodiments of the present invention utilize device-to-device communications among Internet-of-Things (IoT) devices and electronic devices respectively associated with a plurality of users in a staging area to execute edge computing workloads (e.g., analyses). Some mass-transit vehicles can include one or more IoT devices. Other IoT devices are associated with a staging area and/or a related set of queues or queue areas. Embodiments of the present invention utilize various analyses to indicate a queue that the user is to utilize and/or generate contextual information respectively associated with one or more queues and/or a plurality of users.

Embodiments of the present invention utilize the analyses and contextual information obtained various IoT devices related to information and physical elements to generate augmented reality (AR) content and/or AR content overlays to convey the queue identification/selection and/or information related to a queue to a user via an electronic device of the user, such as a smartphone, tablet computer, a wearable device (e.g., smart glasses), etc.

Embodiments of the present invention utilize the obtained information and/or analyses to contextualize information related to a selection (e.g., set) of queues within a staging area, such as respective locations of queues, directions to navigate to an indicated queue, information associated with other users within and/or in proximity to a queue, etc. Information associated with other users may include a destination associated with a user; information associated with a scheduled mass-transit vehicle that another user will use, such as a route number; a route name; an estimate arrival time corresponding a mass-transit vehicle; a service type associated with a mass-transit route (e.g., express, limited-stops; etc.).

Some embodiments of the present invention obtain additional information external to the staging area to further modify analyses, information, and AR elements related to indicating a queue for a user to utilize, such as ridership (e.g., occupancy information) within a mass-transit vehicle corresponding to a route that the user intends to take, a number of doors or entrance/exit points along a mass-transit vehicle, an estimated or anticipated number of riders to disembark at the location of the user, an estimated arrival time of a transport vehicle for a route that includes the destination of the user (i.e., rider), etc. As used herein, the terms riders and users may be used interchangeably, in accordance with various embodiments of the present invention.

Other embodiments of the present invention can be implemented among queues different from queues related to boarding a mass-transit vehicle. For example, queues related to a dictated service associated with a building or a transportation station, such as a security checkpoint, a customs inspection, etc. Embodiments of the present invention can contextualize what is occurring in and around a queue to determine information that affects one or more analyses related to the queue. For example, a queue processing tourist visas may be quicker than a shorter queue that is processing individuals with visas that require work permit checks.

Further embodiments of the present invention can containerize one or more workloads (e.g., analyses, data acquisition, etc.) on some edge devices and/or an edge server that is associated with a mass-transit vehicle and/or a respective staging area. By utilizing edge computing among edge devices and/or an edge server associated with a respective staging area, one skilled in the art would recognize that the bandwidth associated with utilizing a centralized server or a cloud computing system is reduced. In addition, the security of information obtained by the IoT devices is improved because unnecessary information can be filtered near the source.

The descriptions of the various scenarios, instances, and examples related to the present invention have been presented for purposes of illustration but are not intended to be exhaustive or limited to the embodiments disclosed. Various examples used herein are associated with a subway system and are for the purpose of explaining embodiments of the present invention and are not to be construed as a limiting example.

The present invention will now be described in detail with reference to the Figures. FIG. 1 is a functional block diagram illustrating environment 100, in accordance with embodiments of the present invention. In one embodiment, environment 100 includes vehicle 110, staging area 140, and system 180, all interconnected over network 190. In some embodiments, environment 100 includes additional instances of one or more elements (not shown), such as interconnected instances of vehicle 110, a second instance of vehicle 110 corresponding to another set of queues 141 along another edge of staging area 140, multiple instance of IoT device 145, etc. In different embodiment, environment 100 includes one or more dictated services and/or areas of service (not shown) respectively associated with one or more queues of queues 141 and does not include instance of vehicle 110 and related elements.

In various embodiments, environment 100 includes a plurality of device-to-device communications (not shown) respectively associated with one or more elements of environment 100, such as wireless communications. Wireless communication technologies and protocols may include Bluetooth®, LTE-M, narrowband IoT (NB-IoT), near field communication (NFC), etc. Wireless communication signals (not shown) within environment 100 may be broadcast continuously, occur on a periodic basis, are generated in response to polling query, transmitted by a radio-frequency identification (RFID) transponder, generated in response to interrogating a passive RFID tag with radio waves, or a combination thereof.

System 180 may be a laptop computer, a tablet computer, a personal computer, a desktop computer, or any programmable computer systems known in the art. In certain embodiments, system 180 represents a computer system utilizing clustered computers and components (e.g., database server computers, application server computers, etc.) that act as a single pool of seamless resources when accessed through network 190, as is common in data centers and with cloud-computing applications. In general, system 180 is representative of any programmable electronic device or combination of programmable electronic devices capable of executing machine readable program instructions and communicating via network 190 with instances of vehicle 110, instances of IoT device 120, device 131-1 through device 131-N, instances of IoT device 145, and device 150-1 through 150-N.

Figure 4:
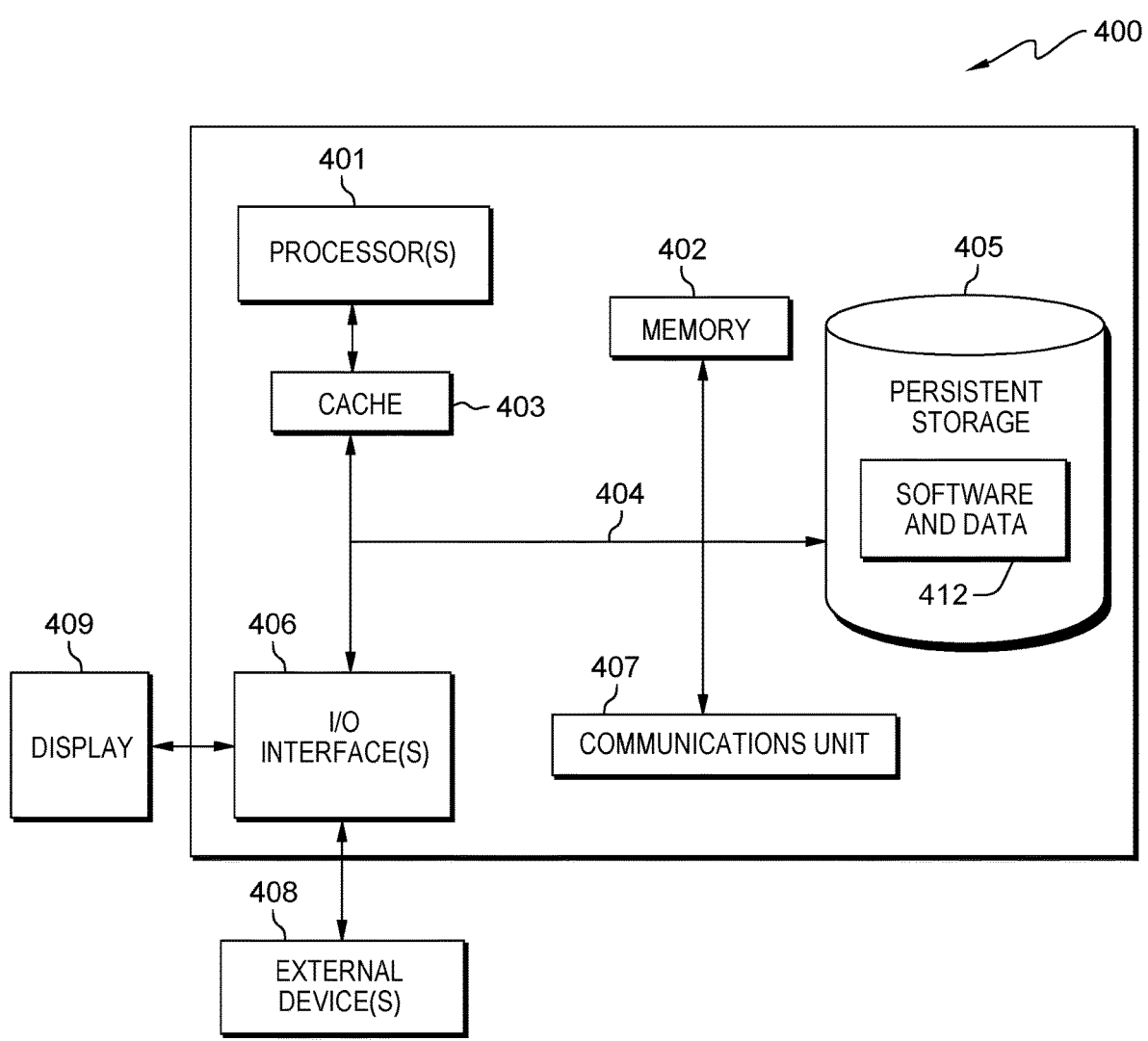
FIG. 4 is a block diagram of components of a computer, in accordance with an embodiment of the present invention.

System 180 may include components, as depicted and described in further detail with respect to FIG. 4, in accordance with embodiments of the present invention. In various embodiments, one or more components of vehicle 110, instances of IoT device 120, and instances of IoT device 145 may include components, as depicted and described in further detail with respect to FIG. 4, in accordance with embodiments of the present invention.

Device 131-1 through 131-N, and device 151-1 through device 151-N may be laptop computers, tablet computers, netbook computers, personal digital assistants (PDA), smart phones, wearable devices (e.g., smart glasses, smart watches, e-textiles, fitness devices, AR headsets, etc.), music players, entertainment consoles or any programmable computer systems known in the art. In general, device 131-1 through 131-N, and device 151-1 through device 151-N are representative of any programmable electronic device or combination of programmable electronic devices capable of executing machine readable program instructions and communicating via network 190. Device 131-1 through 131-N, and device 151-1 through device 151-N may include components, as depicted and described in further detail with respect to FIG. 4, in accordance with embodiments of the present invention.

In an embodiment, one or more of device 131-1 through 131-N, and device 151-1 through device 151-N can wirelessly communicating with one or more instances of IoT device 120, IoT device 145, and/or the Internet. In some embodiments, one or more of device 131-1 through 131-N, and device 151-1 through device 151-N can utilize network 190 to communicate with system 180. In other embodiments, one or more of device 131-1 through 131-N, and device 151-1 through device 151-N respectively utilize an instance of IoT device 120 or an instance of IoT device 145 to send/receive information from system 180 via network 190. In various embodiments, device 131-1 through 131-N, and device 151-1 through device 151-N include programs and features discussed in further detail with respect to FIG. 2, device 200.

Vehicle 110 is representative of an instance of a mass-transit vehicle, such as a bus, a tram, a train car, a subway car, a trolley, a ferry, an airplane, etc. In one embodiment, vehicle 110 represents one vehicle of plurality of interconnected vehicles of a mass-transit mode, such as a car of a passenger train, subway train, etc. In an embodiment, an instance of vehicle 110 includes one or more entrance/exit locations represented by portal 112-1 through portal 112-N, IoT device 120, a plurality of riders represented by user 130-1 through user 130-N and user 134-1 through user 134-N. In various embodiments, one or more features of an instance of vehicle 110 can communicate through network 190 to staging area 140 and/or system 180 separate from communications related to instance of IoT device 120. For example, vehicle 110 communicates speed and location information along a route, whereas IoT device 120 communicates information related to the plurality of riders within an instance of vehicle 110.

In some embodiments, an instance of vehicle 110 can include additional elements of one or more depicted features. In one example, an instance of vehicle 110 includes two sets of portal 112-1 through portal 112-N on opposite sides of vehicle 110, enabling some users to exit from vehicle 110 while other users board vehicle 110 from staging area 140. In another example, an instance of vehicle 110 may include multiple instances of IoT device 120, where differing instance of IoT device 120 perform differing functions (discussed in further detail with respect to IoT device 120 below).

Portals 112-1 through 112-N represent entrance/exit points (e.g., doors) along the perimeter of a respective instances of vehicle 110. In some scenarios, a size associated with portal 112-1 through portal 112-N differs among instances of vehicle 110; thereby affecting the rate of users boarding, exiting, or concurrently traversing a portal within the instance of vehicle 110. In other scenarios, the number of portals represented by portal 112-1 through portal 112-N may be greater than or equal to a set of queues 141 within staging area 140.

In an embodiment, instances of IoT device 120 can include differing functions and capabilities, such as visual monitoring, determining locations (e.g., visually, wirelessly, ultrasonically, etc.) of riders within an instance of vehicle 110, providing a wireless access point (WAP) communications, fingerprint other electronic devices, and/or obtain information from another device associated with a user, such as a smart-pass. In one embodiment, an instance of IoT device 120 within a respective vehicle 110 includes features that determine general ridership information, such as total number of users 130-1 through 130-N and 134-1 through 134-N occupying an instance of vehicle 110, and a number of riders within a proximity of a respective portal of portal 112-1 through portal 112-N. In another embodiment, different instance of IoT device 120 includes wireless communication capabilities that can determine more specific ridership information, such as a defined destination of a rider (e.g., user), an ID corresponding to a ticket or transit pass, a type of ticket or transit pass, fingerprinting an electronic device of a rider, etc.

As used herein, fingerprinting refers to collecting information about of an electronic device for the purpose of identification. For example, fingerprinting may determine a service set identifier (SSID), a wireless communication media access control (MAC) address, a universally unique identifier (UUID), and/or other identifiers associated with an electronic device. Instances of IoT device 120 may include components, as depicted and described in further detail with respect to FIG. 4, in accordance with embodiments of the present invention.

In an embodiment, user 130-1 through user 130-N represent users that have opted-in and can utilize queue selection program 300 and/or be identified by queue selection program 300 (discussed in further detail with respect to FIG. 2). User 130-1 through user 130-N are respectively associated with device 131-1 through device 131-N (previously discussed above), and further with respective info 132-1 through info 132-N discussed in further detail with respect to FIG. 2, information 205).

In another embodiment, user 134-1 through user 134-N represent other users (e.g., riders) that do not or cannot utilize queue selection program 300. User 134-1 through user 134-N may be respectively associated with info 136-1 through 136-N (discussed in further detail with respect to FIG. 2, information 205).

In an embodiment, staging area 140 includes queues 141 (e.g., queue 141-1, queue 141-2, and queue 141-3 through queue 141-N), IoT device 145, a plurality of users (e.g., riders) represented by user 150-1 through 150-N and user 160-1 through user 160-N. In some embodiments, staging area 140 includes a different number of elements and/or one or more other elements (not shown), such as a another set of queues 141 along another edge of staging area 140, differing instances of IoT device 145, an edge server (not shown), etc.

In one embodiment, queues 141 represent areas where one or more riders gather to prepare to board an instance of vehicle 110 prior to and/or in response to an arrival of an instance of vehicle 110 that corresponds to a route utilized by a rider. In one scenario, a queue of queues 141 is a predefined area along staging area 140. In another scenario, the position and number of queues of queues 141 dynamically varies based on various factors, such as the number of arriving instances of vehicle 110 corresponding to a route, a stopping location along staging area 140 related to arriving instances of vehicle 110, a number of portals 112-1 through 112-N within an instance of vehicle 110, etc.

In a different embodiment, queues 141 represent areas of service or dictated services. For example, some instances of queues 141 within a transportation hub may occur prior to a user entering staging area 140, other instances of queues 141 must be traversed by a user prior to exiting a transportation hub, another instance of queues 141 can control access to other locations, such as a transportation hub, a membership area, a governmental building, etc. A dictated service respectively associated with queues 141 may include: a security checkpoint, a customs station, a screening area, etc. The functions and/or services provided among queue 141-1, queue 141-2, queue 141-3, and queue 141-N can differ. In another example, queue 141-1 is an automated checkpoint for travelers without luggage and queue 141-3 is a multi-step inspection checkpoint for travels with luggage or other items. In addition, a dictated service area may be staffed (e.g., include inspectors, enforcement officials, etc.) and/or include equipment, such as a metal detector, an X-ray scanner for items, a millimeter wave scanner, a biometric sensor, etc.

Instances of IoT device 145 may include functions and/or capabilities previously discussed with respect to instances of IoT device 120. In an embodiment, an instance of IoT device 145 within staging area 140 includes features that determine general ridership information, such as total number of users 150-1 through 150-N and 160-1 through 160-N, and a number of users within a queue area or within a proximity of a respective queue of queues 141. In some embodiments, instances of IoT device 145 can determine respective destination and/or route information associated with one or more users. In one scenario, an instance of IoT device 145 can query a device of a user such as device 151-1 of user 150-1 to obtain an accessible portion of info 152-1. In other scenarios, an instance of IoT device 145 can also access information related to one or more of info 162-1 through info 162-N, such as information stored on a smart-card, or information traceable to a transit pass ID included within an RFID tag.

In a further embodiment, some instances of IoT device 145 can perform other functions, such as image recognition to determine other information related to a user, such as carried luggage, accompanies a child, requires special assistance or seating preferences, etc. In some embodiments, an instance of IoT device 145 can include edge computing capabilities. Instances of IoT device 145 may include components, as depicted and described in further detail with respect to FIG. 4, in accordance with embodiments of the present invention.

In an embodiment, user 150-1 through user 150-N represent users that have opted-in and can utilize queue selection program 300 and/or be identified by queue selection program 300 (discussed in further detail with respect to FIG. 2). User 150-1 through user 150-N are respectively associated with device 151-1 through device 151-N (previously discussed above), and further with respective info 152-1 through info 152-N and respective ARI 158-1 through ARI 158-N (discussed in further detail with respect to FIG. 2, information 205 and augment reality information (ARI) 235).

In an embodiment, user 160-1 through user 160-N represent users (e.g., riders) that are not directly identified by queue selection program 300, such as users that have opted-out queue selection program 300. User 160-1 through user 160-N are respectively associated with info 162-1 through 162-N (discussed in further detail with respect to FIG. 2, information 205).

In a different embodiment, one or more instances of info 136-1 through info 136-N and/or info 162-1 through info 162-N represents information store on a device associated with utilizing a mode of transportation, such as a smart-card, a travel card, a transit pass, etc., (not shown). Information within an instance of info 136-1 through info 136-N and/or info 162-1 through info 162-N may include an ID number, an account number, a type of transit pass or ticket (e.g., a monthly pass, an unlimited transfer pass, a destination specific ticket, a remaining balance on the pass, etc.). In one example, info 136-1 is stored on a transponder-type device. In another example, info 162-1 is stored on a non-powered device that can be read (i.e., interrogated) by an instance of IoT device 145 via electrical contacts and/or in response to one or more type of electromagnetic fields, such as a wireless communication signals, or NFC.

System 180 includes scheduling information 182, occupancy information 184, historic information 185, service information 186, and a plurality of other programs and data (not shown). Examples of other programs and data included in system 180 may include one or more databases; a visualization program depicting routes and status/position of a plurality of instance of vehicle 110; communication programs; a video monitoring program; an AR program; analysis programs, such as statistical analysis, contextual analysis, and an image recognition program; ticket information; etc. (not shown). In some embodiments, system 180 hosts a server version of queue selection program 300.

Scheduling information 182 includes information related to a plurality of mass-transit methods. In an embodiment, scheduling information 182 includes a table of routes and corresponding route numbers; a scheduled arrival time at a staging area respectively associated with a route; a number of mass-transit vehicles respectively associated with an instance of a transportation method assigned to a route (e.g., a number of passenger cars of a train); a stopping location along a staging location corresponding to a stop along a route; and a related set of information related to portals (e.g., doors) utilized by riders to board/exit a mass-transit vehicle. Scheduling information 182 may also include other information related to a mass-transit vehicle, such as an estimated arrival time to a stop along a route; a ridership capacity; available features within a mass-transit vehicle, such as a bathroom, Internet access, types of seating, etc.

In an embodiment, occupancy information 184 includes a near real-time assessment of ridership within a respective mass-transit vehicle (e.g., an instance of vehicle 110) operating along a route. In various embodiments, one or more instances of IoT device 120 within an instance of vehicle 110 determine the number and/or position of a plurality of riders (e.g., users) within the instance of 110. In addition, occupancy information 184 includes other related known or identifiable ridership information for each stop along a mass-transit route, such as a number of users expected to board and/or exit an instance of vehicle 110 at each stop along a route, based on accessible information (e.g., info 132-1 through info 132-N, info 152-1 through info 152-N).

Historic information 185 includes a plurality of ridership, route information, and/or mass-transit vehicle information that occurred at least at one day prior to the current day and determined over an extended period of time, such as one or more years. In an embodiment, historic information 185 also includes statistical analyses, contextual analyses, and/or correlations derived from the historic data. In one example, historic information 185 includes an estimated value, a range values, and/or a probability of a change of ridership respectively associated with a route and a stop along the route. Various embodiments, historic information 185 includes ridership information that is contextualized with regard to one or more factors, such as weather, time of day, day of week, time of year, holidays, etc.

In another embodiment, historic information 185 includes ridership information that is further divided between an estimated number of unidentified users respectively associated with a route and a stop along the route and the number of monitored riders known to utilize a respective route and a stop (e.g., location to board, destination to exit) a vehicle along the route. In other embodiments, if a rider opts-in for data collection, then historic information 185 further includes more granular data related to monitored riders, such as days of the week that the user utilizes a given route, a boarding location, a destination (e.g., stops of a route), changes to ridership patterns of the user based on time of year, holidays, weather conditions, etc.

Service information 186 may include, a location of a queue corresponding to a dictated service; a list of tasks performed at a dictated service (i.e., check point) for a given type of user, such as a tourist, a guest worker, a certified frequent traveler, etc.; a duration corresponding to a staffer (i.e., worker) to perform one or more tasks at a checkpoint; inspection criteria corresponding to items (e.g., luggage) and/or documentation of a user, such as a visa, a passport, a record of vaccinations, etc.; one or more responses to problems identified during an inspection at a checkpoint; etc. Service information 186 may further include information related to durations that an item of inspection equipment takes to complete a task, such as X-raying a piece of luggage and analyze images of objects depicted in the X-ray.

In one embodiment, instances of vehicle 110, respective instances of IoT device 120, instances of IoT device 145, communicates through network 190 to system 180. In some embodiments, a one or more of device 131-1 through device 131-N and device 151-1 through 151-N communicates through network 190 to system 180. In another embodiment, other aspects of staging area 140, such as an edge server (not shown) can communicate through network 190 to system 180. Network 190 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 190 can be any combination of connections and protocols that will support communications between a feature of vehicle 110, instances of IoT device 120, instances of IoT device 145, system 180, and/or the Internet (not shown), in accordance with embodiments of the present invention. In various embodiments, network 190 operates locally via wired, wireless, or optical connections and can be any combination of connections and protocols (e.g., personal area network (PAN), near field communication (NFC), laser, infrared, ultrasonic, etc.).

In one scenario, information transmitted by instances of IoT device 120 via network 190 may be forwarded after processing by IoT device 145 to one or more of user 150-1 through user 150-N. In an example, if staging area 140 supports two or more transportation platforms, then IoT device 145 filters the information that is sent to user 150-1 through user 150-N based on the platform (e.g., set of queue

141-1 through queue 141-N) that corresponds to the track utilized by a given instance of vehicle 110. In another scenario, information transmitted via network 190 to respective instances of IoT device 120 may be received by user 130-1 through user 130-N within an instance of vehicle 110.

Some embodiments of the present invention can utilize various accessible data sources, such as info 152-1 of device 151-1 related to user 150-1, that may include storage devices and content associated with the user. In example embodiments, instances of queue selection program 300 or a ridership program (not shown) of system 180 allow the user to opt-in or opt-out of exposing types and categories of information. Instances of queue selection program 300 and/or the ridership program enable the authorized and secure handling of user information, such as tracking information, as well as types and categories of information that may have been obtained, is maintained, and/or is accessible. The user can be provided with notice of the collection of types and categories of information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected. In other embodiments, purchasing a ticket (e.g., utilizing the ridership program) to access one or more mass-transit vehicles, such as vehicle 110 can be construed as opt-in consent.

In various embodiments, personal and/or user-specific data that is collected by aspects of system 180 is collected with the consent of a user. In addition, a user can opt-in or opt-out of system 180 collecting specific information related to the user. In response to a user opting-out of a type of information that system 180 utilizes for various decisions, predictions, and/or planning purposes, aspects of system 180 will anonymize opted-out user information. For example, if a user opts-out of tracking information, then system 180 disassociated the ID of the user from the boarding location of a mass-transit vehicle, the destination (i.e., exiting location) of the user, and the specific pairing of a boarding location to a corresponding destination.

FIG. 2 is an illustrative example of device 200 of a user. Device 200 is representative of one or more instances of device 131-1 through device 131-N and device 151-1 through 151-N, in accordance with embodiments of the present invention. In an embodiment, device 200 includes, information 205, camera 210, display 215, communication unit 220, augmented reality program 230, augmented reality information (ARI) 235, queue selection program 300, and a plurality of program and data (not shown). For example, device 200 may include a global positioning system (GPS), a camera application (app), image recognition software, a ridership app, an Internet interface, a calendar function, a clock function, etc. In some embodiments, the ridership app (not shown) of device 200 can be utilized as smart-ticket or a transit pass to access staging area 140 prior to boarding an instance of vehicle 110.

In other embodiments, if an instance of device 200 does not include sufficient computing resources to execute one or more aspects of queue selection program 300, then a hosted instance of queue selection program 300 provides AR content (i.e., augmented reality information (ARI) 235) to the instance of device 200. A hosted instance of queue selection program 300 can execute on an edge server (not shown) associated with staging area 140; an edge device, such as an instance of IoT device 145; and/or system 180.

Information 205 is representative of one or more instances of info 132-1 through info 132-N and/or info 152-1 through info 152-N. In one embodiment, information 205 electronic mass-transit information corresponding to a user such as a utilized route and/or a destination of the user. In an embodiment, if a user of device 200 opts-in to share information, then information 205 can also include an ID of a user, a destination of a user, a schedule of a user, etc. Information 205 may also include display preferences, thresholds of uncertainty that trigger another response by queue selection program 300, an indication to accept an alternative route suggestion if a calendar conflict does not occur, etc. In another embodiment, information 205 also includes encrypted user information associated with travel, such as enhanced ID data (e.g., enhanced driver's license data), passport information, Real ID data, free and secure trade (FAST) data, etc. In some embodiment, information 205 is general information related to device 200 and does not include use-based data. General information may be information that can be fingerprinted by instance of IoT device 120 and/or instance of IoT device 145, such as an SSID, UUID, or MAC address.

In different embodiments, information 205 represents information related to a user that is not stored within device 200. For example, info 162-N associated with user 160-N and/or info 136-1 associated with user 134-1, such as general ridership information (e.g., information stored within a smart-ticket or a mass-transit pass that includes an RFID tag). Information within an instance of info 136-1 through info 136-N and/or info 162-1 through info 162-N may include an ID number, an account number, a type of transit pass (e.g., a monthly pass, an unlimited transfer pass, a destination specific pass, a remaining balance on the pass, etc.). In one example, information 205 is stored on a transponder type device. In another example, information 205 is stored on a passive (e.g., non-powered device) that can be read (i.e., interrogated) by an instance of IoT device 145 via electrical contacts and/or in response to one or more type of electromagnetic fields, such as a wireless communication signals, or NFC.

Camera 210 represents a camera that faces away from a user of device 200 and captures images and/or video within a field of view of camera 210, such as a portion of portion of staging area 140, one or more queues of queues 141, and a plurality of users (e.g., riders). In an embodiment, images and/or video captured by camera 210 are presented to the user via display 215 in near-real time. In some embodiments, queue selection program 300 can utilize images/video captured by camera 210 to make various determinations related to staging area 140 and one or more queues of queues 141. In other embodiments, queue selection program 300 forwards some images/video captured by camera 210 to IoT device 145 and/or system 180 for further analysis and/or contextualization of one or more elements within a captured image/video.

In one embodiment, display 215 can display images/video obtained from camera 210 and dynamically include ARI 235 based on device 200 executing AR program 230. Display 215 can presents elements of ARI 235 to a user, such as content overlay associated with information and determinations generated by queue selection program 300. In some embodiments, display 215 is a device linked to device 200, such as a smart-watch, smart glasses, etc. In another embodiment, if display 215 cannot directly display images/videos captured by camera 210, then information and determinations generated by queue selection program 300 are contextualized and modified by AR program 230 to compensate for the constraints of display 215, such as limiting the queue selection information to text and symbols (e.g., arrows, lines, gifs, etc.).

In one embodiment, communication unit 220 provides device-to-device communications within staging area 140, such as between device 151-1 and IoT device 145. In another embodiment, communication unit 220 provides device-to-device communications within vehicle 110, such as between device 131-1 and IoT device 120. In various embodiments, communication unit 220 also provides communication capabilities to network 190.

AR program 230 is an augmented reality program that generates AR elements and AR content overlays within a captured picture (still image) or a video feed obtained by camera 210 within an instance of device 200, and further based on instances of ARI 235 generated by an instance of queue selection program 300. In one embodiment, AR program 230 applies colors, symbols, and/or content overlays (e.g., text information) in association with images of at least one or more queues of queues 141, such as queue 141-3.

In an example, AR program 230 highlights where queue 141-1, queue 141-2, and queue 141-3 will occur along the edge of staging area 140. In another example, AR program 230 embeds text information related one or more elements of environment 100, such as an estimated boarding duration, a portal of vehicle 110 associated with a bottleneck exiting riders, identifying concurrent movement through a portal of an instance of vehicle 110, and/or a message suggesting to consider wait to board the next vehicle 110 corresponding to another route that includes the destination of the user. In some embodiments, AR program 230 applies additional content overlays (i.e., data associated with ARI 235) to one or more riders within staging area 140. For example, AR program 230 may indicate respective routes/route numbers that at least user 150-1 through user 150-N are anticipated to board.

In an embodiment, ARI 235 represents a plurality of stored AR content determined by at least queue selection program 300 for a respective user. For example, ARI 158-1 includes the AR content determined for use by user 150-1, such as indicating to join queue 141-2. In another embodiment, ARI 235 includes information that can be applied to images/video captured by camera 210 on-demand or in real-time as a user scans staging area 140. ARI 235 may include images and symbols that indicate the respective locations of one or more queues of queues 141, content overlays indicating a number of waiting users for a given route, a route respectively associated with another user, a status of vehicle 110 associated with a given route, etc.

Queue selection program 300 is a program that obtains ridership information and information related to vehicles of mass-transit method. In response, queue selection program 300 generates AR elements and AR content overlays associated with a staging area and individuals (e.g., riders, users) within the staging area. In one embodiment, queue selection program 300 automatically selects a queue from among a plurality queues associated with the staging area and displays AR elements corresponding queue that the user is to join to travel to a destination. In another embodiment, queue selection program 300 presents a user with a selection of AR information respectively associated with a plurality of users (e.g., riders) and/or queues within the staging area, such as a route name/number and an anticipated destination. In some embodiments, queue selection program 300 bases some determinations on information received from IoT devices within respective vehicles that traverse routes what stop at the staging area and at least one route that includes the destination of the user, such as the number of riders to exit at staging area 140 and the placement of riders relative to the portals of the vehicle.

In other embodiments, queue selection program 300 can utilize historic ridership information and contextual information, such as a day of the week, time of day, etc., and apply analytics and cognitive analyses to predict and/or estimate queue-related information and determinations in response to having too little data or highly variable user data to analyze. For example, queue selection program 300 determines that a large number of users (e.g., riders) have monthly passes as opposed to tickets for a specific route and a destination. In response, queue selection program 300 can access historic data to estimate a number of unidentified users within the staging area that will board a given mass-transit vehicle.

In different embodiment, queue selection program 300 automatically selects a queue from among a set of queues related to one or more dictated services within a transportation hub, building, or venue and displays the AR elements related to one or more queues. Queue selection program 300 bases a selection and/or included AR information on one or more factors, such as speed of a staffer of a dictated service, a complexity of an interactions at a dictated service (e.g., luggage inspection, document verification, etc.), a number of user within a group to be processed together (e.g., processing a family), behaviors of members of a group, etc.

Figure 3:
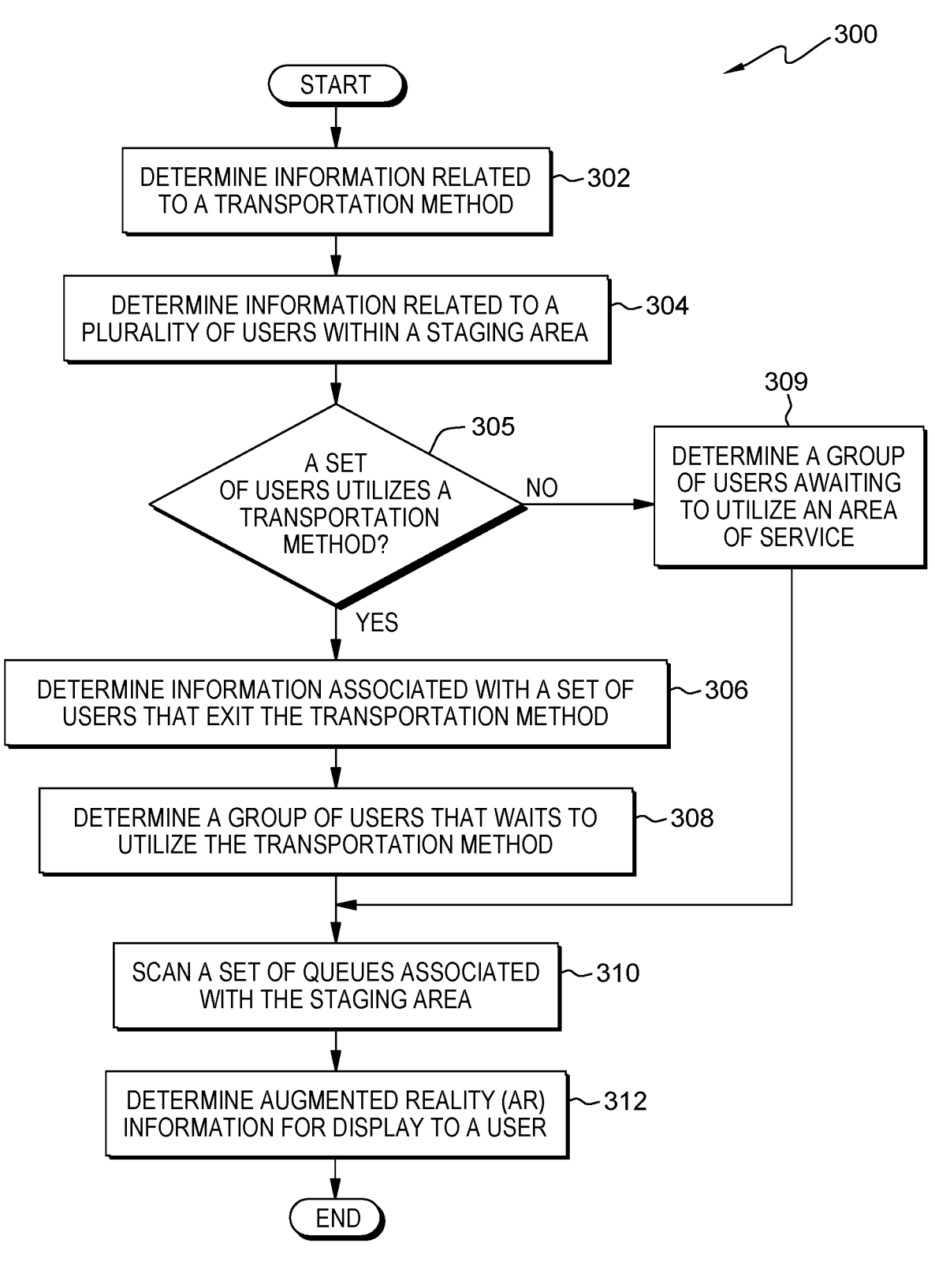
FIG. 3 depicts a flowchart of steps of a queue selection program, in accordance with an embodiment of the present invention.

FIG. 3 is a flowchart depicting operational steps for queue selection program 300, a program for analyzing information associated with riders at a staging area of a mass-transit location and utilizing augmented reality (AR) to provide a user information related to queues within the staging area, in accordance with embodiments of the present invention.

In step 302, queue selection program 300 determines information related to a transportation method. In one embodiment, queue selection program 300 determines information related to a transportation method based on information included within scheduling information 182, such as a scheduled or estimated arrival time at staging area 140 for an instance of vehicle (e.g., for a mass-transit vehicle) corresponding to a route/route number, a number of interconnected instances of vehicle 110 (e.g., cars of a train) corresponding to a route/route number, an estimated stopping location along staging along staging 140, and a corresponding set of locations respectively associated with portal 112-1 through portal 112-N for the instance of vehicle 110 along staging 140, etc.

In some embodiments, queue selection program 300 determines additional information related to a transportation method, such as ridership based on information respectively associated with an instance of a vehicle 110 corresponding to a route/route number within occupancy information 184, an estimated number of riders to board or exit at a given stop along the route, etc. In various embodiments, queue selection program 300 can obtain near-real time data from one or more instances of IoT device 120 respectively associated with an instance of a vehicle 110 corresponding to a route/route number, such as changes to occupancy data, locations of riders with respect to one or more portals of portal 112-1 through portal 112-N.

In step 304, queue selection program 300 determines information related to a plurality of users within a staging area. In one embodiment, queue selection program 300 utilizes information within info 152-1 though info 152-N, such as transit pass/ticket information to determine the respective destination, routes, and/or instance of vehicle 110 that one or more of user 150-1 through 150-N are anticipated or scheduled to board. In one scenario, queue selection program 300 determines information related to a user 150-1 through user 150-N within staging area 140 based on communications among device 151-1 through 151-N. In another scenario, queue selection program 300 determines information related to a user 150-1 through user 150-N within staging area 140 based on one or more instances of IoT device 145 aggregating info 152-1 though info 152-N. In another embodiment, if one or more of info 162-1 through info 162-N is stored on a smart-card or was uploaded to system 180, then queue selection program 300 can determine some information related to one or more of user 160-1 through user 160-N.

In decision step 305, queue selection program 300 whether a set of users utilizes a transportation method. In one embodiment, queue selection program 300 determines that a set of users utilizes a transportation method based on the users utilizing an instance of staging area 140 corresponding to a boarding/disembarking location, such as a subway platform. In another embodiment, queue selection program 300 determines that a set of users does not utilizes a transportation method based on the users entering an instance of staging area 140 related to one or more dictated services.

Responsive to determining that a set of users utilizes a transportation method (Yes branch, decision step 305), queue selection program 300 determines information associated with a set of users that exit the transportation method (step 306).

In step 306, queue selection program 300 determines information associated with a set of users that exit the transportation method. Queue selection program 300 can filter and/or not transmit information related to an instance of vehicle 110 that is not related to a route that the user may utilize. Information associated a transportation method may include an estimated number of riders to exit an instance of vehicle 110 via one or more of portal 112-1 through portal 112-N to access staging area 140, a capacity of an instance of vehicle 110, an estimated disembarking duration for a group of riders exiting through a given portal, etc. In one embodiment, queue selection program 300 determines information associated with the set of users to disembark from an instance of vehicle 110 based on information forwarded from one or more respective instance of IoT device 120 within an instance of vehicle 110.

In another embodiment, queue selection program 300 obtains information associated with the set of users that exit an instance of vehicle 110 based on information forwarded from one or more respective instance of IoT device 120 within an instance of vehicle 110 and/or stored within occupancy information 184 included within system 180. In some embodiments, if queue selection program 300 cannot determine information associated with the set of users that utilize a transportation method, then queue selection program 300 queries system 180 and historic information 185 to obtain an estimated number of other riders to exit instances of vehicle 110 in response to the transportation method arriving at staging area 140.

Still referring to step 306, in other embodiments queue selection program 300 can utilize ridership information and locations of available exits (e.g., instance of portal 112-1 through portal 112-N) corresponding to one or more instance of vehicle 110 to determine potential exiting/boarding bottlenecks. In a further embodiment, queue selection program 300 determines additional information associated with one or more users to exit an instance of vehicle 110 based on image recognition performed by instances of IoT device 120, such as identifying luggage associated with one or more users, users with mobility constraints, a number of users within a related group (e.g., a family, a tour group, etc.).

In step 308, queue selection program 300 determines a group of users waiting to utilize the transportation mode. In one embodiment, queue selection program 300 filters and/or aggregates information obtained in step 304 to determine a group of users awaiting to utilize (i.e., board) an instance of vehicle 110. In some embodiments, queue selection program 300 identifies different groups of users waiting to utilize a transportation mode based on the routes and/or destinations associated with the plurality of users within staging area 140.

In other embodiments, if queue selection program 300 cannot determine a route or a potential destination for a threshold number of users, then queue selection program 300 queries system 180 and historic information 185 to obtain an estimated number of other riders that will utilize at least the route and associated instances of vehicle 110 that the user plans to utilize. In another embodiment, queue selection program 300 can obtain estimates of ridership from system 180 for a later route that the user can utilize to travel to a planned destination.

Referring to decision step 305, responsive to determining that a set of users do not utilize a transportation method (No branch, decision step 305), queue selection program 300 determines a group of users awaiting to utilize an area of service (step 309).

In step 309, queue selection program 300 determines a group of users awaiting to utilize an area of service. In one embodiment, queue selection program 300 determines a group of users awaiting to utilize an area of service (i.e., a dictated service), such as a screening checkpoint prior to utilizing an instance of vehicle 110 of a transportation mode and/or entering an access controlled location based on information obtained from one or more instances of IoT device 145 related to staging area 140 that includes one or more dictated service areas (not shown). In another embodiment, queue selection program 300 also determines information respectively associated with one or more users of user 150-1 through user 150-N, within staging area 140 related to areas of a dictated service, based in information stored within info 152-1 through info 152-N. For example, queue selection program 300 may identify the type of user and a set of tasks performed within a dictated service area based on the type of user.

In various embodiments, queue selection program 300 determines a number of available areas of dictated service, the number of queues 141 respectively associated with an area of dictated service, and other details associated with an area of dictated service based on information within service information 186 of system 180. Other details may include, a speed of processing of a staffer for one or more tasks, a number of tasks to perform with regard to a given user, a duration to complete one or more tasks, etc.

Still referring to step 309, in some embodiments queue selection program 300 determines additional information related to one or more users of the group of users utilizing an area of dictated service based on image recognition or other analyses performed by one or more instances of IoT device 145, such as identifying a quantity of luggage associated with a user, whether the two or more users are traveling as a group (e.g., a family unit), detect a potential problem (e.g., behaviors, words, gestures, semantics, etc.) that could trigger another response that delays processing within an area of dictated service, etc.

In step 310, queue selection program 300 scans a set of queues associated with the staging area. Queue selection program 300 may utilizes a combination of methods to scan a set of queues within queues 141 associated with a staging area 140. In one embodiment, queue selection program 300 utilizes images and/or video captured by camera 210 of a device of a user, such as device 151-1 of user 150-1 to scan a set of queues within queues 141 associated with staging area 140. In another embodiment, queue selection program 300 utilizes one or more instances of IoT device 145 to scan a set of queues within queues 141 within staging area 140. Queue selection program 300 may also determine information related to a set of queues within staging area 140 based on information included within scheduling information 182. For example, queue selection program 300 scan for queues associated with an instance of vehicle 110 due to arrive at staging area 140 for a mass-transit route.

In various embodiments, in response to scanning a set of queues associated with the staging area 140 queue selection program 300 utilizes information determined in one or more prior steps and information related to scanning a set of queues to perform one or more analyses or determinization related to a user. For example, queue selection program 300 utilizes information, such as an estimated boarding duration respectively associated with a portal of vehicle 110, a number of users within a queue area or within a proximity of a queue that are identified as utilizing the same route as the user, ridership within an instance of vehicle 110, etc., to automatically select a queue for the user is to join. Alternatively, queue selection program 300 determines to present a selection of information and/or results of analyses to a user.

Still referring to step 310, in other embodiments, queue selection program 300 scan queues associated with one or more dictated services areas. Queue selection program 300 may determine information related to a set of queues within staging area 140 based on information included service information 186. In a further embodiment, queue selection program 300 scans a set of queues to identify real-time changes within staging area 140, such as other users changing queue selections; a late rush of additional users entering staging area 140; identifying a user or group of users that could cause delays within a queue related to a dictated service, such as users that are arguing, a user speaking a language different from the language of a worker staffing a dictated service, a user (e.g., traveler) that has as large quantity of luggage, etc.

In step 312, queue selection program 300 determines augmented reality (AR) information for display to a user. Queue selection program 300 may utilize AR program 230 to augment images and/or video captured by camera 210 of the device of the user to display ARI 235 determined for the user of device 200, such as device 151-N of user 150-N. In an embodiment, queue selection program 300 determines one or more sets of ARI 235 respectively associated with a perspective of a user based on images and/or video captured by camera 210 of the user. In one embodiment, in response to selecting a queue from among a set of queues of queues 141, queue selection program 300 determines and displays AR elements corresponding to the selected queue and/or a path to the selected queue that the user is to utilize to board an instance of vehicle 110.

In another embodiment, queue selection program 300 displays, to a user, a selection of AR information respectively associated with multiple elements within staging area 140. For example, queue selection program 300 displays information associated with other users (e.g., riders) and/or queues, such as routes or anticipated destinations corresponding to other users, respective locations for queue/ portal pairings along staging area 140 that the user may utilize to board an instance of vehicle 110, an estimated duration to board an instance of vehicle 110 via a given portal, flagging a portal of vehicle 110 that is associated with a bottleneck of exiting riders, ranking queue choices, a text suggestion to the user, such as "arriving train at 89% capacity, consider delaying and utilize route X19, route X19 at only 46% ridership capacity."

In step 312, in some embodiments queue selection program 300 can dynamically update displayed AR information displayed to a user based on changes external to staging area 140, such as arrival delays identified by system 180, an instance of IoT device 120 within an instance of vehicle 110 identifying a problem associated with riders exiting the instance of vehicle 110 through a given portal, an instance of IoT device 120 identifying concurrent exiting/boarding via a portal of an instance of vehicle 110, etc.

FIG. 4 depicts computer system 400, which is representative device 131-1 through 131-N, device 151-1 through device 151-N, and system 180. Computer system 400 is also representative of one or more components of vehicle 110 and various of instances of IoT device 120 and instances of IoT device 145. Computer system 400 is an example of a system that includes software and data 412. Computer system 400 includes processor(s) 401, cache 403, memory 402, persistent storage 405, communications unit 407, input/ output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 180, software and data 412 scheduling information 182, occupancy information 184, historic information 185, service information 186, and other programs and data (not shown). With respect to some instances of device 200, such as device 151-1 through device 151-N and device 131-1 through device 131-N, software and data 412 includes information 205, augmented reality program 230, augmented reality information 235, queue selection program 300, and other data and programs (not shown). With respect to instances of IoT device 120 and instances of IoT 145 device, software and data 412 includes firmware, other data, and programs (not shown).

Communications unit 407, in these examples, provides for communications with other data processing systems or devices, including resources of one or more components of instances of vehicle 110, instances of IoT device 120, device 131-1 through device 131-N, instances of IoT device 145, device 151-1 through device 151-N, and system 180. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for providing augmented reality (AR) information to users within a transportation infrastructure, comprising:

receiving, via a wireless telecommunications network, by an edge server associated with a staging area, and from a first computer device associated with a first user, contextual information for the first user including a destination;

identifying, by the edge server and using the contextual information, a first vehicle within the transportation infrastructure to be boarded by the first user using one of a plurality of queues for the first vehicle within the staging area;

receiving, via the wireless telecommunications network, by the edge server, from Internet of Things (IoT) edge computing devices within the first vehicle, and prior to the first vehicle arriving at the staging area, ridership information associated with access locations respectively associated with each of the plurality of queues;

determining, by the edge server and based on image recognition performed by the IoT edge computing devices within the first vehicle, information indicating that one or more users within the first vehicle have one or more mobility constraints;

automatically selecting, by the edge server and using the contextual information, the ridership information, and the information indicating that the one or more users within the first vehicle have the one or more mobility constraints, a queue from the plurality of queues, wherein utilizing the edge server to select the automatically-selected queue utilizes less bandwidth than a quantity of bandwidth associated with utilization of a centralized server;

communicating, via the wireless telecommunications network, by the edge server, and via the first computer device, the AR information that includes an identification of the automatically-selected queue; and causing, by the edge server, the AR information to be overlayed on a display of the first computer device, in real-time, over a video stream of the staging area while the first user scans the staging area, wherein the first vehicle is one vehicle in a plurality of interconnected vehicles, and wherein the AR information is modified based on one or more constraints of the display of the first computer device.

2. The method of claim 1, wherein a determination is made that a group of users is related to the first user, and the automatically selecting is based upon the group of users.

3. The method of claim 1, wherein the automatically selecting is additionally based upon ridership information, collected by IOT edge computing devices within the staging area, for each of the plurality of queues.

4. The method of claim 3, wherein the automatically selecting is based upon real-time ridership information for the plurality of queues.

5. The method of claim 1, wherein the AR information to be overlayed over the video stream includes a route to the automatically-selected queue.

6. The method of claim 1, wherein the automatically selecting is additionally based upon predicted ridership information for the first vehicle, the predicted ridership information predicted using historical ridership information.

7. The method of claim 1, wherein the contextual information is received, via radio frequency identification (RFID) communication, from an electronic ticket that includes an RFID tag, wherein the electronic ticket is directly associated with the first user.

8. A computer hardware system configured to provide augmented reality (AR) information to users within a transportation infrastructure, comprising:

a hardware processor of an edge server configured to initiate one or more executable operations, the one or more executable operations comprising:

receiving, via a wireless telecommunications network, by the hardware processor of the edge server, and from a first computer device associated with a first user, contextual information for the first user including a destination;

identifying, by the hardware processor of the edge server and using the contextual information, a first vehicle within the transportation infrastructure to be boarded by the first user using one of a plurality of queues for the first vehicle within a staging area;

receiving, via the wireless telecommunications network, by the hardware processor of the edge server, from Internet of Things (IoT) edge computing devices within the first vehicle, and prior to the first vehicle arriving at the staging area, ridership information associated with access locations respectively associated with each of the plurality of queues;

determining, by the hardware processor of the edge server and based on image recognition performed by the IoT edge computing devices within the first vehicle, information indicating that one or more users within the first vehicle have one or more mobility constraints;

automatically selecting, by the hardware processor of the edge server and using the contextual information, the ridership information, and the information indicating that the one or more users within the first vehicle have the one or more mobility constraints, a queue from the plurality of queues, wherein utilizing the edge server to select the automatically-selected queue utilizes less bandwidth than a quantity of bandwidth associated with utilization of a centralized server;

communicating, via the wireless telecommunications network, by the hardware processor of the edge server, and via the first computer device, the AR information that includes an identification of the automatically-selected queue; and causing, by the hardware processor of the edge server, the AR information to be overlayed on a display of the first computer device, in-real time, over a video stream of the staging area while the first user scans the staging area, wherein the first vehicle is one vehicle in a plurality of interconnected vehicles, and wherein the AR information is modified based on one or more constraints of the display of the first computer device.

9. The computer hardware system of claim 8, wherein a determination is made that a group of users is related to the first user, and the automatically selecting is based upon the group of users.

10. The computer hardware system of claim 8, wherein the automatically selecting is additionally based upon ridership information, collected by IOT edge computing devices within the staging area, for each of the plurality of queues.

11. The computer hardware system of claim 10, wherein the automatically selecting is based upon real-time ridership information for the plurality of queues.

12. The computer hardware system of claim 8, wherein the AR information to be overlayed over the video stream includes a route to the automatically-selected queue.

13. The computer hardware system of claim 8, wherein the automatically selecting is additionally based upon predicted ridership information for the first vehicle, the predicted ridership information predicted using historical ridership information.

14. The computer hardware system of claim 8, wherein the contextual information is received, via radio frequency identification (RFID) communication, from an electronic ticket that includes an RFID tag, wherein the electronic ticket is directly associated with the first user.

15. A computer program product comprising:
   a computer readable storage medium having program code stored thereon, the program code, which when executed by a computer hardware system of an edge server configured to provide augmented reality (AR) information to users within a transportation infrastructure, causes the computer hardware system of the edge server to perform:
      receiving, via a wireless telecommunications network, by the computer hardware system of the edge server, and from a first computer device associated with a first user, contextual information for the first user including a destination;
      identifying, by the computer hardware system of the edge server and using the contextual information, a first vehicle within the transportation infrastructure to be boarded by the first user using one of a plurality of queues for the first vehicle within a staging area;
      receiving, via the wireless telecommunications network, by the computer hardware system of the edge server, from Internet of Things (IoT) edge computing devices within the first vehicle, and prior to the first vehicle arriving at the staging area, ridership information associated with access locations respectively associated with each of the plurality of queues;
      determining, by the computer hardware system of the edge server and based on image recognition performed by the IoT edge computing devices within the first vehicle, information indicating that one or more users within the first vehicle have one or more mobility constraints;
      automatically selecting, by the computer hardware system of the edge server and using the contextual information, the ridership information, and the information indicating that the one or more users within the first vehicle have the one or more mobility constraints, a queue from the plurality of queues, wherein utilizing the edge server to select the automatically-selected queue utilizes less bandwidth than a quantity of bandwidth associated with utilization of a centralized server;
      communicating, via the wireless telecommunications network, by the computer hardware system of the edge server, and via the first computer device, the AR information that includes an identification of the automatically-selected queue; and
      causing, by the computer hardware system of the edge server, the AR information to be overlaid on a display of the first computer device, in real-time, over a video stream of the staging area while the first user scans the staging area, wherein the first vehicle is one vehicle in a plurality of interconnected vehicles, and wherein the AR information is modified based on one or more constraints of the display of the first computer device.

16. The computer program product of claim 15, wherein a determination is made that a group of users is related to the first user, and the automatically selecting is based upon the group of users.

17. The computer program product of claim 15, wherein the automatically selecting is additionally based upon ridership information, collected by IOT edge computing devices within the staging area, for each of the plurality of queues.

18. The computer program product of claim 17, wherein the automatically selecting is based upon real-time ridership information for the plurality of queues.

19. The computer program product of claim 15, wherein the AR information to be overlaid over the video stream includes a route to the automatically-selected queue.

20. The computer program product of claim 15, wherein the automatically selecting is additionally based upon predicted ridership information for the first vehicle, the predicted ridership information predicted using historical ridership information.

* * * * *